Dec. 30, 1958 O. H. WILLIFORD 2,866,854

TONE APPLIER CIRCUIT

Filed March 9, 1956 2 Sheets-Sheet 1

INVENTOR
O. H. WILLIFORD
BY C. Mattice
ATTORNEY

Dec. 30, 1958 O. H. WILLIFORD 2,866,854

TONE APPLIER CIRCUIT

Filed March 9, 1956 2 Sheets-Sheet 2

INVENTOR
O. H. WILLIFORD
BY C. Mattice
ATTORNEY

United States Patent Office 2,866,854

Patented Dec. 30, 1958

2,866,854

TONE APPLIER CIRCUIT

Oscar H. Williford, Bronxville, N. Y., assignor to Bell Telephone Laboratories, Incorporated, New York, N. Y., a corporation of New York Application March 9, 1956, Serial No. 570,510

10 Claims. (Cl. 179—18)

This invention relates to telephone systems and has for its object to facilitate direct distance dialing by telephone subscribers.

During the course of the development of the telephone art, the direction of progress has been from complete operator control to control by the individual subscriber. In the beginning all calls, local as well as interoffice, were established by operators. Later, dial controlled switching systems permitted subscribers to complete local calls, with operators completing those involving interoffice connections and particularly toll calls. With the expansion of the telephone network over greater distances, specially designed toll trunks were required to permit talking and signaling over such distances.

Local switching systems are equipped with means for giving the calling subscriber tone indications of the progress of the call, the tone being interrupted at different rates to give the desired information. For example, when the called subscriber's station is found idle and ringing current is applied thereto, a tone interrupted at the ringing rate is heard by the calling subscriber. On the other hand, if the called subscriber's station is busy, a tone interrupted at the rate of 60 interruptions per minute is heard. Other rates are used for other indications.

Since operator positions are provided with lamp signals and the operators normally disconnect their telephones as soon as they have received the necessary instruction from the calling subscriber, many of the long distance trunks are equipped to flash the associated lamp at the operator's position without providing any tone signal.

With the introduction of a completely automatic toll switching system, the dialing of toll calls by subscribers of many local offices became possible but the routes available for such calls were seriously limited because they could not use trunks which do not provide tone signals.

In accordance with the present invention, means is provided to translate flashing supervisory signals into tone signals.

More specifically the invention provides means responsive to the repeated operation and release of the supervisory relay of the trunk circuit in response to flashing supervisory signals to apply tone signals of corresponding duration to the calling subscriber.

A feature of the invention lies in means to render the tone applier ineffective following a steady operation of the supervisory relay such as caused by the answer of the called subscriber.

A further feature of the invention lies in means for terminating a tone signal independently of the supervisory relay.

In addition, means is provided to open the transmission circuit during signaling so that extraneous noise on the outgoing end of the trunk will not confuse the calling subscriber.

Figure 1:
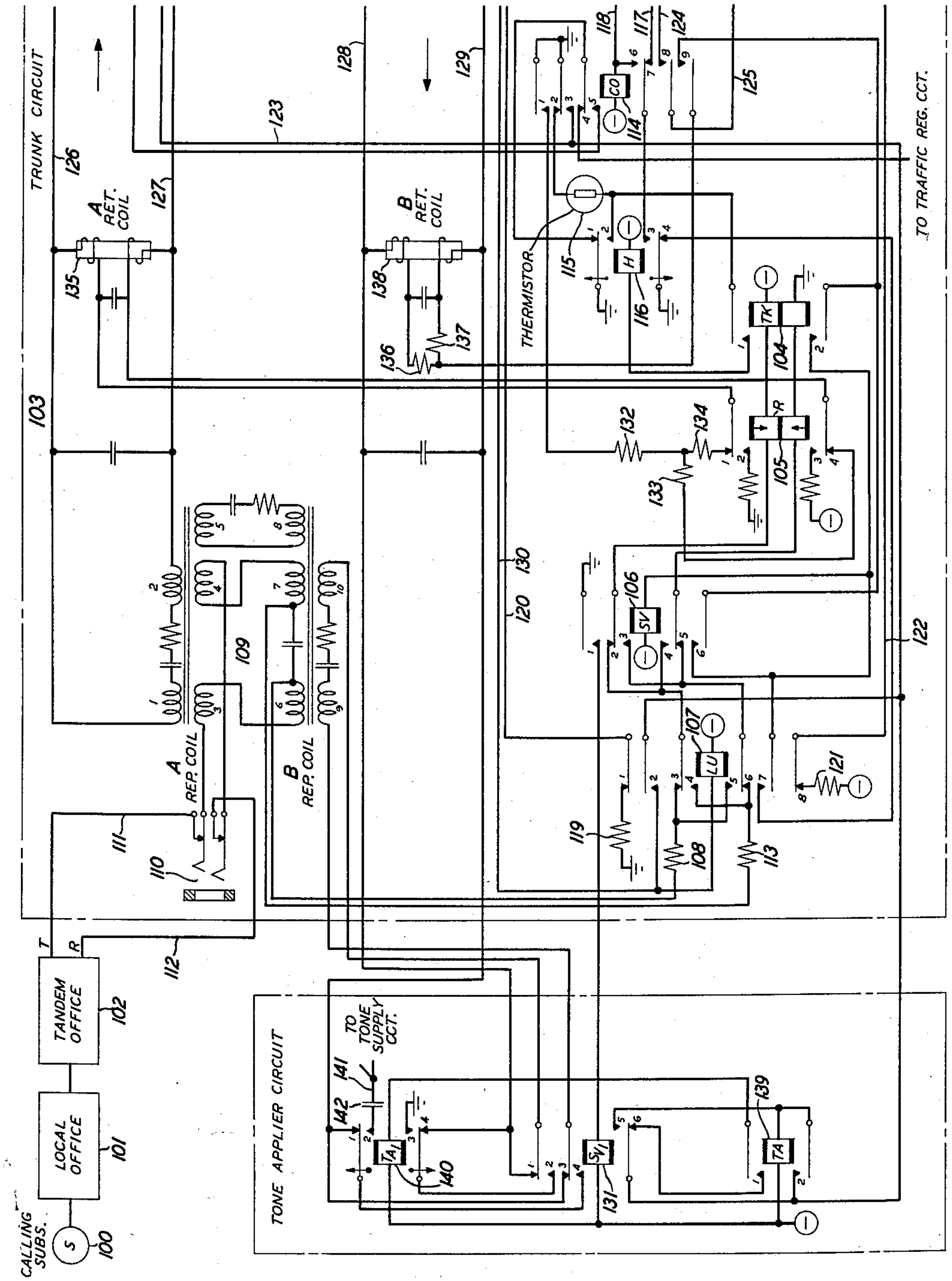
Figure 2:
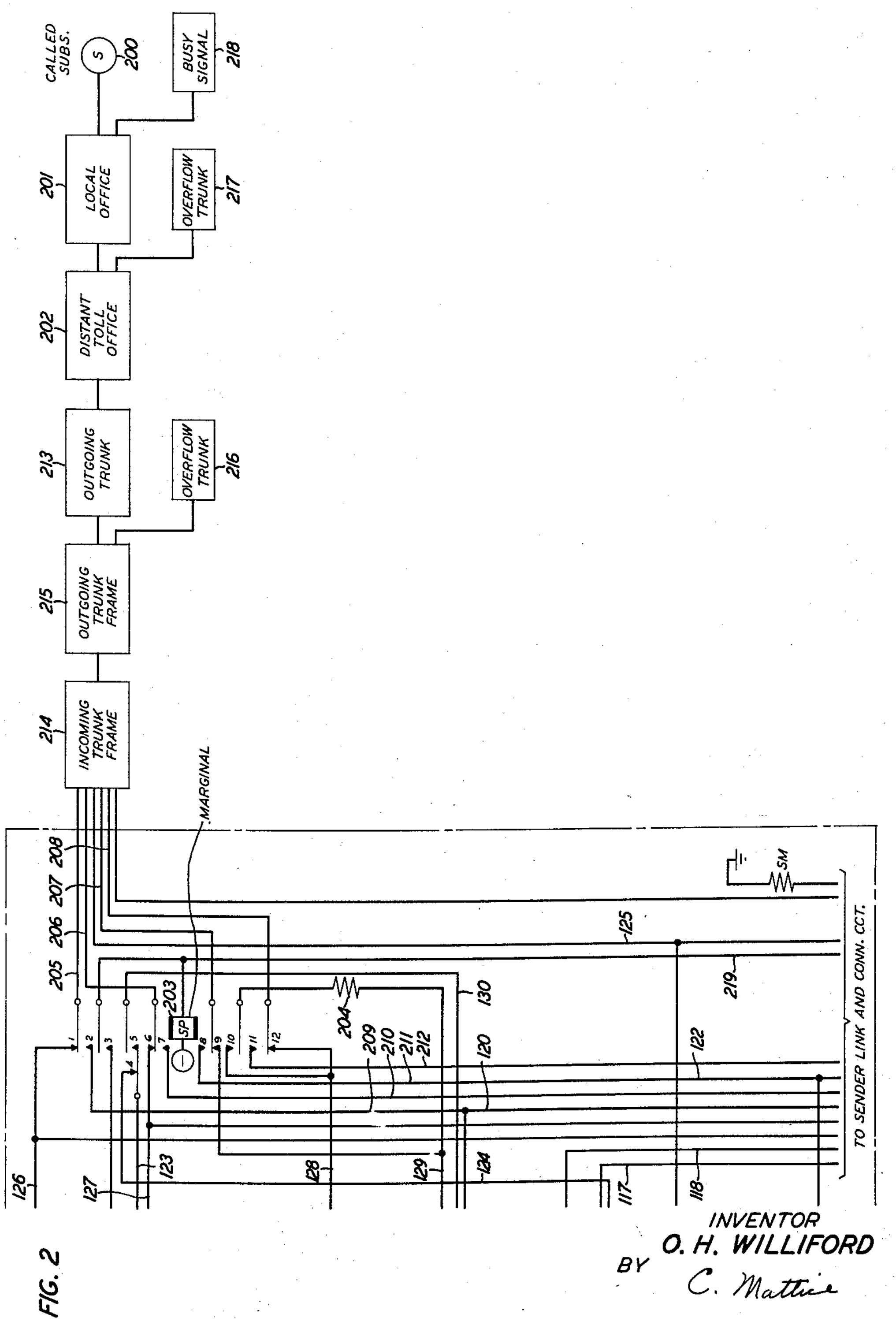

These and other features of the invention will be more clearly understood from a consideration of the following description read in connection with the drawings comprising Figs. 1 and 2 which, with Fig. 2 placed at the right of Fig. 1, show a trunk circuit suitable for use between a tandem office and a toll office, together with the tone applier circuit and a schematic showing of a typical toll connection.

For a detailed disclosure of a fully automatic toll switching system such as indicated schematically in the drawing, reference is made to the application of Goodherham-Jacobitti-Myers-Shipley-Strickler Serial No. 286,267, filed May 6, 1952.

A successfully completed call will first be described. Assume that the calling subscriber at substation 100, whose line appears in local office 101, wishes to talk to the subscriber at substation 200, whose line appears in local office 201, and that office 201 is reached from office 101 through tandem office 102, a first toll office at which the trunk circuit 103 is located and a second toll office 202.

The subscriber at substation 100 will dial the designation of subscriber 200. The local office employs this designation to select a trunk outgoing to tandem office 102 after which the designation is transmitted to the tandem office. The tandem office then employs the designation to select an idle trunk outgoing to the first toll office. When the trunk has been selected, the sender at the tandem office completes a loop circuit which may be traced from battery through the upper winding of the trunk relay 104, upper winding of relay 105, contact 2 of supervisory relay 106, contact 3 of relay 107, resistor 108, through windings 6 and 3 of the hybrid coil 109, tip contact of test jack 110, over tip conductor 111, through the loop at the tandem office 102, ring conductor 112, ring contact of jack 110, windings 4 and 7 of hybrid coil 109, resistor 113, contact 6 of relay 107, contact 5 of relay 106, lower winding of relay 105, lower winding of relay 104 to ground. Relay 104 operates in this circuit, but relay 105 is differentially wound and does not operate. Relay 105 is used by an operator for reringing the called subscriber and has no function in the call being traced.

Relay 104, in operating, closes a circuit from ground over contact 2 of relay 114, through thermistor 115, contact 1 of relay 104, to battery through the winding of relay 116. The heating of thermistor 115 introduces a short delay, after which relay 116 operates and closes a locking circuit for itself at its contact 2 independent of thermistor 115. Thermistor 115 is introduced into the operating circuit of relay 116 to prevent the operation of that relay from transient operations of relay 104, particularly on disconnect.

Relay 116 closes a start circuit for the sender link and connector circuit (not shown) which may be traced from ground over contact 3 of relay 116, contact 7 of relay 114 to conductor 117. The connector circuit functions to connect an idle incoming sender with the trunk circuit, after which the sender connects ground to conductor 118 which extends to battery through the winding of relay 114. Relay 114 operates and locks over its contact 6 to ground at contact 3 of relay 116.

As soon as the sender is connected with the trunk, class information is transmitted to the sender. The circuits for this purpose may be traced from ground through resistor 119 over contact 1 of relay 107 and conductor 120 and from battery through resistor 121 over contact 8 of relay 107 and conductor 122.

It may be noted that the values of resistors 119 and 121 may be varied and that ground may be substituted for the battery connected to resistor 121 to provide a number of class indications in accordance with the requirements of the trunk.

Relay 114, in operating, also connects ground over its contact 3, conductor 123, contact 4 of relay 203, conductor 124, contact 8 of relay 114, to conductor 125, leading to the sender and to the incoming trunk frame 214. This conductor is the one used for holding the switches on the trunk frames and the sender tests for the presence of ground on this conductor before indicating that it is ready to receive the designation.

When the sender has received the class information and has found ground on conductor 125, it connects ground to conductor 219, completing a circuit through the winding of relay 203 to battery to operate relay 203. With relay 203 operated, conductors 205, 206, 207 and 208 are disconnected from conductors 126, 127, 128 and 129 leading to the hybrid coil 109 and are connected to conductors 209, 210, 211 and 212 leading to the sender link to give the sender control over the outgoing connection. Branches of conductors 126 and 127 are extended to the sender while conductors 128 and 129 are connected together over contact 10 of relay 203 through resistor 204 to provide a termination for the coils 9 and 10 of the hybrid coil 109. In addition, relay 203 closes a circuit from ground over contact 3 of relay 114, conductor 123, contact 5 of relay 203, conductor 130 to battery through the winding of relay 107. Relay 107 operates in this circuit and disconnects the class indications from conductors 120 and 122. Relay 107 closes a locking circuit for itself over its contact 2 to ground on conductor 123. In addition, relay 107 reverses the connection of battery and ground through the windings of relay 104 to the incoming conductors 111 and 112 as a start-send signal to the sender at the tandem office 102.

Multifrequency pulses representing the designation of the wanted line are now sent out over conductors 111 and 112 by the sender at the tandem office 102, being transmitted through the hybrid coil 109 to conductors 126 and 127 and thence to the incoming sender. When a designation has been received, the sender calls in a marker (not shown) which selects an idle outgoing trunk such as trunk 213 forming a part of the route indicated by the designation, operates switches on the incoming trunk frame 214 and the outgoing trunk frame 215 to connect the incoming trunk with the selected outgoing trunk and transmits an indication to the sender that the connection has been established.

The seizure of outgoing trunk 213 initiates operations at the distant toll office 202 similar to those already described for the first toll office and when the office 202 is ready to receive pulses a start-send signal is transmitted to the sender at the first toll office, causing the sender to transmit the registered designation to office 202. At the distant toll office 202, the designation is employed to set up a connection to the proper local office, for example, local office 201, where the call is completed to the called subscriber 200 and a ringing current is applied to the called substation.

When the sender at the first toll office has completed its functions, it opens the circuit of relay 203 and that relay releases. With relay 203 released, ground is connected over contact 3 of relay 114, conductor 123, contact 4 of relay 203, conductor 124, contact 8 of relay 114 to conductor 125 to hold the switches on frames 214 and 215. The talking circuit comprises a two-wire section including conductors 111 and 112 and the windings 3, 4, 6 and 7 of the hybrid coil 109 and a four-wire section comprising an outgoing section including windings 1 and 2 of hybrid coil 109 and an incoming section including windings 9 and 10 of hybrid coil 109. Windings 1 and 2 of coil 109 are connected over conductors 126 and 127, contacts 1 and 6 of relay 203, conductors 205 and 206 to the incoming trunk frame 214, while windings 9 and 10 of hybrid coil 109 are connected over contacts 3 and 1 of relay 131, conductors 128 and 129, contacts 12 and 9 of relay 203 and conductors 207 and 208 to the incoming frame 214.

With the talking circuit established, as above-traced, a pad control circuit is closed from ground over contact 1 of relay 114, resistor 132 and thence in simplex through resistors 133 and 134 over contacts 1 and 4 of relay 105 through the windings of retard coil 135 to conductors 126 and 127. A supervisory circuit is also closed from battery through the winding of supervisory relay 106, contact 2 of relay 104, contact 9 of relay 114 and thence in simplex through resistors 136 and 137, windings of retard coil 138 to conductors 128 and 129.

When ringing current is applied to the called subscriber's line, ringing tone, which is within the voice frequency range, is returned over the established connection to inform the subscriber at substation 100 that the called subscriber is being signaled. When the called subscriber answers, an off-hook signal is extended from the local office 201 by way of the distant toll office 202 and the intermediate trunks which results in the operation of supervisory relay 106 over the circuit above-traced. Relay 106, in operating, locks in a circuit from battery through its winding and over its contact 6 to its operating circuit independent of relay 104.

It will be remembered that, when the trunk was first seized, battery through the upper winding of relay 104 was connected over back contacts of relays 106 and 107 to conductor 111 and ground through the lower winding of relay 104 was connected over other back contacts of relays 106 and 107 to conductor 112. When relay 107 operated, under control of the sender, battery through the upper winding of relay 104 was transferred to conductor 112 and ground through the lower winding of relay 104 was transferred to conductor 111. When now relay 106 operates as an indication that the called subscriber has answered, battery through the upper winding of relay 104 is again connected to conductor 111 over front contacts of relays 106 and 107 while ground through the lower winding of relay 104 is again connected to conductor 112 over front contacts of relays 106 and 107. Relay 106, when operated, completes a circuit from ground over its contact 1 through the winding of the auxiliary supervisory relay 131 to battery. Relay 131 operates in this circuit and in turn closes a circuit from ground over contact 3 of relay 114, contact 5 of relay 131 to battery through the winding of relay 139, operating relay 139.

At the end of the conversation, when the subscriber at substation 200 disconnects, an on-hook signal is returned to the toll office causing relay 106 to release, in turn releasing relay 131, and reversing the connection of battery and ground through the windings of relay 104 to transmit an on-hook signal to the tandem office 102.

When the calling subscriber at station 100 disconnects, the equipment at the local office 101 and the tandem office 102 is released, thereby opening the circuit of relay 104 causing that relay to release. The release of relay 104 opens the locking circuit of relay 116 which releases slowly because of its slow-to-release characteristic. When relay 116 releases, it opens the locking circuit for relay 114 and that relay also releases. Relay 114 at its contact 1 opens the pad control circuit and at its contacts 3 and 8 opens the holding circuit of the switches on the trunk frames, releasing the outgoing end of the connection. In addition, at its contact 3, relay 114 opens the locking circuit of relay 107 causing that relay to release and restore the connection of battery and ground through the windings of relay 104 to conductors 111 and 112. With relay 107 released, the class indications are again connected to conductors 120 and 122 and the trunk circuit is ready for another call.

In general, there are two conditions which may prevent the completion of a call such as that above described. These are failure to find an idle trunk leading in the required direction and a busy condition of the called line. For example, if the marker at the first toll office can find no idle trunk for the required route, it will connect the incoming trunk to an overflow trunk such as trunk 216. Similarly, if the marker at the distant toll office 202 cannot find an idle trunk leading to the local office 201 it will connect the incoming trunk at that office to an overflow trunk such as trunk 217. If the local office 201 finds the called substation 200 busy, it will connect a busy signal indicated at 218 to the trunk incoming to the local office. Overflow trunks normally apply flashing signals at the rate of 120 impulses per minute while line busy signals flash at the rate of 60 impulses per minute. In response to either of these signals, the supervisory relay 106 is operated and released at the corresponding rate.

It will be remembered that relay 106, in operating, in turn operated relays 131 and 139, relay 131 following the operations and releases of relay 106 at the same rate. Relay 139, when operated, locked over its contact 2 to ground at contact 3 of relay 114 and therefore remains operated.

With relay 131 operated, the connection between conductors 128 and 129 and coils 9 and 10 of hybrid coil 109 is placed under the control of relay 140 and may be traced from conductor 128, contact 4 of relay 140, contact 2 of relay 131, windings 10 and 9 of hybrid coil 109, contact 4 of relay 131, contact 1 of relay 140 to conductor 129. At the first release of relay 106, followed by the release of relay 131, a circuit is closed from ground at contact 3 of relay 114, contact 6 of relay 131, contact 1 of relay 139, winding of relay 140 to battery, operating relay 140. With relay 131 released, conductors 128 and 129 are connected to the windings 9 and 10 of hybrid coil 109 over back contacts of relay 131 and the operation of relay 140 is ineffective. In the case of a completed call, the release of relay 131 is followed by the release of relays 104 and 113 so that the locking circuit of relay 139 is opened, thereby releasing relays 139 and 140.

In the case of a flashing signal, relays 106 and 131 reoperate after an interval determined by the flashing rate. Relay 131, in reoperating, opens the circuit of relay 140, but that relay is slow to release and remains operated for a measured interval following the reoperation of relay 131. With relays 131 and 140 operated, the windings 9 and 10 of hybrid coil 109 are disconnected from conductors 128 and 129 and a tone circuit is closed from tone conductor 141, condenser 142, contact 2 of relay 140, contact 4 of relay 131, windings 9 and 10 of hybrid coil 109, contact 2 of relay 131, contact 3 of relay 140 to ground. Tone from this circuit is transmitted through the hybrid coil 109 to the calling subscriber. Disconnecting coils 9 and 10 of the hybrid coil from conductors 128 and 129 prevents any audio-frequency signals which may exist on the outgoing end of the connection as set up from reaching the calling subscriber and interfering with the tone received.

At the next flash, relay 131 again releases, reclosing the transmission circuit over conductors 128 and 129 and terminating the tone signal. While relay 131 is released, the operating circuit for relay 140 is reclosed so that relay 140 is ordinarily held operated throughout the flashing period and the application and removal of the tone is under control of relay 131. If for any reason, after flashing has started, relay 131 remains operated, relay 140 releases after an interval to terminate the tone and reclose the transmission circuit.

When the calling subscriber disconnects in response to this tone signal, relay 104 releases, in turn releasing relays 114 and 116. With relay 114 released, the locking circuit of relay 139 is opened, terminating the tone signals. Relay 106, if operated, when relay 104 releases, remains locked over the simplex circuit until the next flash when it releases and cannot reoperate with relay 104 released.

It may be noted that relay 106, when operated and released, in response to a flashing signal, repeatedly reverses connection of battery and ground to the incoming conductors 111 and 112 thereby making the flashing signal available to an operator's position if the call has been handled by an operator.

What is claimed is:

1. In a telephone system, a trunk circuit incoming to a toll office, a calling subscriber station, a called subscriber station, means to connect said calling station to said trunk circuit, means to extend a connection from said trunk circuit through said toll office toward said called subscriber station, a supervisory relay in said trunk circuit, means to repeatedly operate and release said supervisory relay if said connection cannot be completed to said called subscriber station, a tone applier in said trunk circuit, means responsive to the first operation and release of said supervisory relay to prepare said tone applier, and means responsive to each subsequent operation of said supervisory relay to transmit a tone signal to said calling subscriber station.

2. In a telephone system, a trunk circuit incoming to a toll office, a calling subscriber station, a called subscriber station, means to connect said calling station to said trunk circuit, means to extend a connection from said trunk circuit through said toll office toward said called subscriber station, a supervisory relay in said trunk circuit, means to repeatedly operate and release said supervisory relay if said connection cannot be completed to said called subscriber station, a tone applier in said trunk circuit, means responsive to the first operation and release of said supervisory relay to prepare said tone applier, means responsive to each subsequent operation of said supervisory relay to transmit a tone signal to said calling subscriber station, and means in said tone applier to terminate each tone signal independent of said supervisory relay.

3. In a telephone system, a trunk circuit incoming to a toll office, a calling subscriber station, a called subscriber station, means to connect said calling station to said trunk circuit, means to extend a connection from said trunk circuit through said toll office toward said called subscriber station, a supervisory relay in said trunk circuit, means to repeatedly operate and release said supervisory relay if said connection cannot be completed to said called subscriber station, a tone applier in said trunk circuit, means responsive to the first operation and release of said supervisory relay to prepare said tone applier, means responsive to each subsequent operation of said supervisory relay to transmit a tone signal to said calling subscriber station, and means under the control either of said tone applier or of said supervisory relay to terminate said tone signal.

4. In a telephone system, a trunk circuit incoming to a toll office, a calling subscriber station, a called subscriber station, means to connect said calling station to said trunk circuit, means to extend a connection from said trunk circuit through said toll office toward said called subscriber station, a supervisory relay in said trunk circuit, means to repeatedly operate and release said supervisory relay if said connection cannot be completed to said called subscriber station, a tone applier in said trunk circuit, means responsive to the first operation and release of said supervisory relay to prepare said tone applier, means responsive to each subsequent operation of said supervisory relay to transmit a tone signal to said calling subscriber station, a normally closed voice transmission circuit extending through said trunk circuit, and means under the joint control of said tone applier and said supervisory relay to open said voice transmission circuit.

5. In a telephone system, a trunk circuit incoming to a toll office, a calling subscriber station, a called subscriber station, means to connect said calling station to said trunk circuit, means to extend a connection from said trunk circuit through said toll office toward said called subscriber station, a supervisory relay in said trunk circuit, means to repeatedly operate and release said supervisory relay if said connection cannot be completed to said called subscriber station, a tone applier in said trunk circuit, means responsive to the first operation and release of said supervisory relay to prepare said tone applier, means responsive to each subsequent operation of said supervisory relay to transmit a tone signal to said calling subscriber station, a normally closed voice transmission circuit extending through said trunk circuit, and means under the joint control of said tone applier and said suprevisory relay to open said voice transmission circuit while said tone signal is being transmitted.

6. In a telephone system, a trunk circuit incoming to a toll office, a calling subscriber station, a called subscriber station, means to connect said calling station to said trunk circuit, means to extend a connection from said trunk circuit through said toll office toward said called subscriber station, a supervisory relay in said trunk circuit, means to repeatedly operate and release said supervisory relay if said connection cannot be completed to said called subscriber station, a tone applier in said trunk circuit, means responsive to the first operation and release of said supervisory relay to prepare said tone applier, means responsive to each subsequent operation of said supervisory relay to transmit a tone signal to said calling subscriber station, a normally closed voice transmission circuit extending through said trunk circuit, means under the joint control of said tone applier and said supervisory relay to open said voice transmission circuit while said tone signal is being transmitted, and means under the control either of said tone applier or of said supervisory relay to reclose said transmission circuit.

7. In a telephone system, a trunk circuit incoming to a toll office, a calling subscriber station, a called subscriber station, means to connect said calling station to said trunk circuit, means to extend a connection from said trunk circuit through said toll office toward said called subscriber station, a supervisory relay in said trunk circuit, means to repeatedly operate and release said supervisory relay if said connection cannot be completed to said called subscriber station, a tone applier comprising a pair of relays, means responsive to the first operation and release of said supervisory relay to operate said pair of relays in succession, and means responsive to subsequent operations of said supervisory relay to transmit tone signals to said calling subscriber station.

8. In a telephone system, a trunk circuit incoming to a toll office, a calling subscriber station, a called subscriber station, means to connect said calling station to said trunk circuit, means to extend a connection from said trunk circuit through said toll office toward said called subscriber station, a supervisory relay in said trunk circuit, means to repeatedly operate and release said supervisory relay if said connection cannot be completed to said called subscriber station, a tone applier comprising a first relay and a second relay, means responsive to a first operation of said supervisory relay to operate said first relay, said first relay locking operated, means responsive to the subsequent release of said supervisory relay to operate said second relay, means under the joint control of said supervisory relay and said second relay to transmit a tone signal to said calling subscriber station, and means under the control either of said supervisory relay or said second relay to terminate said tone signal.

9. In a telephone system, a trunk circuit incoming to a toll office, a calling subscriber station, a called subscriber station, means to connect said calling station to said trunk circuit, means to extend a connectoin from said trunk circuit through said toll office toward said called subscriber station, a supervisory relay in said trunk circuit, means to repeatedly operate and release said supervisory relay if said connection cannot be completed to said called subscriber station, a tone applier comprising a first relay and a second relay, means responsive to a first operation of said supervisory relay to operate said first relay, said first relay locking operated, means responsive to the subsequent release of said supervisory relay to operate said second relay, means under the joint control of said supervisory relay and said second relay to transmit a tone signal to said calling subscriber station, means under the control either of said supervisory relay or said second relay to terminate said tone signal, a normally closed voice transmission circuit extending through said trunk circuit, and means under the joint control of said supervisory relay and said second relay to open said transmission circuit while said tone signal is being transmitted.

10. In a telephone system, a trunk circuit incoming to a toll office, a calling subscriber station, a called subscriber station, means to connect said calling station to said trunk circuit, means to extend a connection from said trunk circuit through said toll office toward said called subscriber station, a supervisory relay in said trunk circuit, means to repeatedly operate and release said supervisory relay if said connection cannot be completed to said called subscriber station, a tone applier comprising a first relay and a second relay, means responsive to a first operation of said supervisory relay to operate said first relay, said first relay locking operated, means responsive to the subsequent release of said supervisory relay to operate said second relay, means under the joint control of said supervisory relay and said second relay to transmit a tone signal to said calling subscriber station, means under the control either of said supervisory relay or said second relay to terminate said tone signal, a normally closed voice transmission circuit extending through said trunk circuit, means under the joint control of said supervisory relay and said second relay to open said transmission circuit while said tone signal is being transmitted, and means under the control of either said supervisory relay or said second relay to reclose said transmission circuit.

References Cited in the file of this patent

UNITED STATES PATENTS

| | | |
|---|---|---|
| 2,516,788 | Molnar | July 25, 1950 |
| 2,685,617 | Kessler et al. | Aug. 3, 1954 |
| 2,693,507 | Ridd | Nov. 2, 1954 |

UNITED STATES PATENT OFFICE

CERTIFICATE OF CORRECTION

Patent No. 2,866,854 December 30, 1958

Oscar H. Williford

It is hereby certified that error appears in the above numbered patent requiring correction and that the said Letters Patent should read as corrected below.

In the grant, line 1, name of inventor, for "Oscar H. Wiliford" read -- Oscar H. Williford --.

Signed and sealed this 21st day of April 1959.

(SEAL)

Attest:

KARL H. AXLINE

Attesting Officer

ROBERT C. WATSON
Commissioner of Patents